United States Patent Office 2,878,246
Patented Mar. 17, 1959

2,878,246

PREPARATION OF 6-METHYL STEROIDS OF THE PREGNANE SERIES FROM DIOSGENIN

Luis E. Miramontes, Miguel A. Romero, and Fortunato Ahuad Farjat, Mexico City, Mexico, assignors to G. D. Searle & Co., Chicago, Ill., a corporation of Delaware No Drawing. Application September 27, 1957
Serial No. 686,562

12 Claims. (Cl. 260—239.55)

The present invention relates to a novel method for the preparation of 6-methyl steroids from diosgenin, and to the novel intermediates resulting from the method.

The C–6 methylated steroids have recently been demonstrated to be potent chemotherapeutic agents, e. g., Spero et al., J. A. C. S. 79, p. 1515 (1957). However, for widespread utilization of C–6 methylated compounds such as 6α-methyl, 11β,17α-dihydroxy-21-acetoxy-4-pregnene-3,20-dione or 6α-methyl-11β,17α,21-trihydroxy-1,4-pregnadiene-3,20-dione it is necessary to assure their availability in large, preferably unlimited, quantities.

Since diosgenin, and its acetate, can be prepared inexpensively from plant materials in unlimited quantities, synthesis from diosgenin would make the C–6 methylated steroids commercially available to the medical profession. The instant invention provides a method for converting diosgenin into novel C–6 methyl steroids, which in turn can be converted into the compounds described by the Spero et al. article.

The following equations illustrate preparation of 6-methyl-5,16 pregnadien 3β-ol 20-one acetate.

Thus, for example, compound V may be converted into 6α-methyl-17α-hydroxyprogesterone by following the procedure outlined in Fritsche et al. application S. N. 686,564 filed simultaneously herewith. As disclosed in Loken application S. N. 686,563 filed simultaneously herewith, 6α-methyl-17α-hydroxy progesterone and its 17 esters exhibit progestational activity.

Briefly, the process is as follows:

Diosgenin acetate (I) is treated with an organic peracid to form the corresponding oxide, (II) which as expected is obtained as a mixture of the α and β-oxides. The α-oxide (III) is isolated by fractional crystallization and treated with methyl magnesium bromide to obtain 5α-hydroxy-6β-methyl tigogenin (IV) which, under the conditions employed for degradation to the pregnane series, undergoes a dehydration at C–5 to form, predominantly, 6-methyl - 5,16 - pregnadien-3β-ol-20-one acetate (V); confirmation of the 5-6 location of the double bond is obtained by the difference of molecular rotation calculated from the data reported by L. F. Fieser and J. Rigaudy for the cholesterol series [J. A. C. S. col. 73, p. 4660 (1957)].

The instant process contains several novel features apparently uniquely applicable to the diosgenin series, which are specifically desirable expedients in the synthesis of the C–6 methyl derivatives. These expedients will be detailed in the description of the overall process which follows.

The epoxidation can be accomplished employing conventional reagents, for example, per acetic acid, perphthalic acid or perbenzoic acid under conventional epoxidizing conditions. In each instance the oxide product is a mixture of the α, β epimeric oxides of diosgenin (II).

Inasmuch as only the reaction of the α oxide with the Grignard reagent results in the desired 6-methylation, a

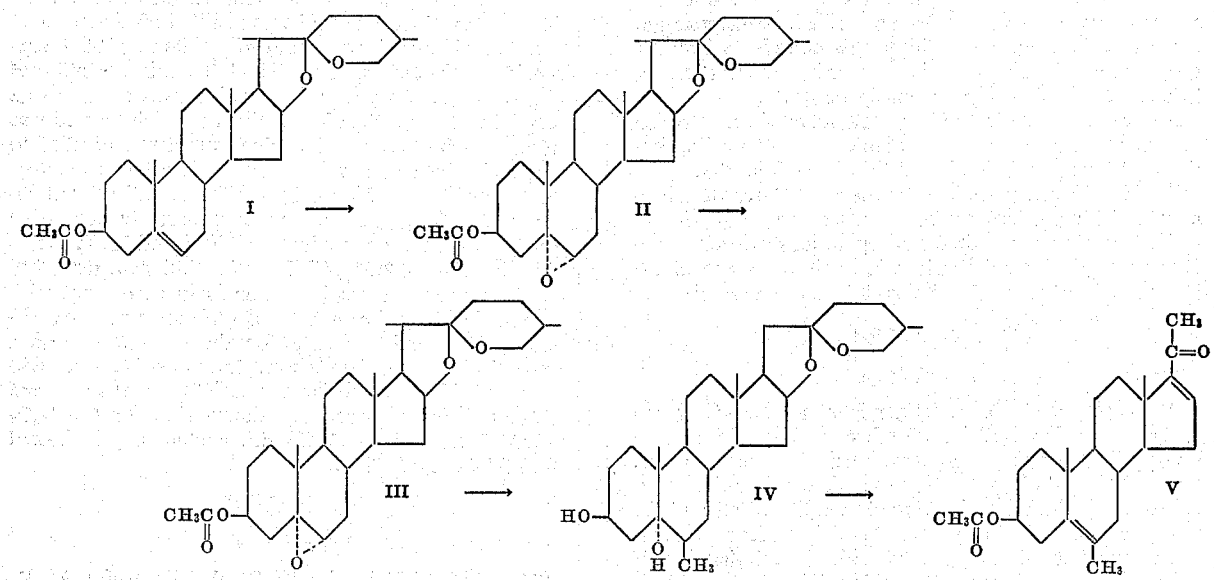

Compound V, i. e., 6-methyl Δ⁵,¹⁶-pregnadien 3β-ol 20-one acetate is a direct 6-methylated homologue of the well-known intermediate for corticoids, androgens, estrogens and progestional hormones: Δ⁵,¹⁶-pregnadien 3-β-ol-20-one acetate (16-dehydropregnenolone acetate). As such it is convertible, for example, into the 6α methyl Δ⁴-pregnene-11β,17α-21-triol-3,20-dione described by the Spero et al, article or the 6-methyl progesterone disclosed by Ringold et al. (J. Org. Chem., January 1957, pp. 99, 100). It may also, of course, be converted into such other C–6 methyl compounds as may be required in the future by the medical profession.

separation of the α and β oxides and employment only of the α oxide will prevent wastage of valuable reagents by production of undesired side products from the β oxide. Moreover, separation of the α and β oxides allows, for example, recycling the β oxide via formation of the 5,6 glycol then its methyl sulfonate and back to an oxirane ring having the α configuration. According to the practice of the instant invention the α and β oxide separation can be effected by fractional crystallization from heptane as set forth in the examples. The differential solubility of the epimeric oxides in the solvent allows crystallization to proceed fractionally. Similarly the corresponding α and β oxides of diosgenin acetate may be separated by crystallization from methanol.

The Grignard methylation proceeded differently in the diosgenin series as compared with the prior art. Ether was not found to be at all suitable as a solvent since prolonged boiling gave essentially unchanged starting material. Tetrahydrofurane, which has been employed extensively as a solvent for reactions with methylmagnesiumbromide gave low yields after four days of reflux. It was found that benzene and even more so its methylated homologues toluene and xylene were exceedingly satisfactory and gave the desired 6β-methyl-5α-hydroxytigogenin (or more exactingly named: 6β-methyl-22-isoallospirostane-3β,5α-diol) in yields from 80–85% (depending upon purity) by weight. Benzene as a solvent required 8 hours for completion of the reaction, toluene 2½ hours and xylene ¾ to 1 hour reaction time. Thus toluol and the xylols are preferred solvents.

Necessary and sufficient confirmation for the presence and location of the double bonds of the ultimate product, namely, the 6β-methyl-$\Delta^{5,16}$-pregnadien-3β-ol-20-one acetate, was provided by:

(i) Catalytic hydrogenation over a palladium on carbon catalyst clearly showed that 2 moles of hydrogen were absorbed per mol of steroid.

(ii) By difference of molecular rotation calculated from the data reported (the Fieser and Rigaudy article) for the cholesterol series.

(iii) By its subsequent conversions to known products.

The usefulness of this invention lies in the fact that the 6-methyl corticoids are potent chemotherapeutic agents which can be seen from the recent publication of Spero, Thompson, Magerlein, Hanze, Murray, Sebek and Hogg, J. Am. Chem. Soc. 78, 6213 (1956). Also the 6-methylated androgens and corpora lutea hormone have important hormonal properties [H. J. Ringold, E. Batres and G. Rosenkranz, J. Org. Chem. 22, 99 (1957)]. These compounds are all readily available from the 6-methyl-$\Delta^{5,16}$-pregnadien-3β-ol-20-one acetate, the synthesis of which comprises this invention. The conversion to the 6-methyl progesterones have already been described. Conversion of the pregnadien compound V to 6α-methyl-17α-hydroxy progesterone is disclosed in copending application of Fritsche et al. filed simultaneously herewith.

The examples which follow shall serve via illustration to engender a clear understanding of the sundry implications and technical details of this invention. To those skilled in the art, variations of the procedures described may unfold; particularly so, because the synthesis described herein are multiple step operations, without however construing any limitations in spirit and scope of the invention by the details disclosed in these examples.

EXAMPLE I

Epoxidation 100 grams of $\Delta^{5-22}$-isospirosten 3β-ol acetate (diosgenin acetate) was dissolved in 500 ml. of chloroform, a solution of 50 g. of monoperphthalic acid in ether at 0° C. was added, and after standing overnight at ambient temperature the phthalic acid formed was filtered off and the filtrate water washed to neutrality. The aqueous extracts were concomitantly reextracted with 2 small batches of chloroform (50 ml. each), the chloroform was combined with the washed filtrate and concentrated almost to dryness in the steam bath. Addition of 500 ml. of methanol followed by concentration to a final volume of 225 ml., afforded 65 g. of 5α,6α-oxido-22-isoallospirostan-3β-ol acetate, M. P., 225–230° C. and $[\alpha]_D$, —120° (chloroform). This product was considered of sufficient purity for the subsequent Grignard reaction. The pure α-epoxide was obtained after additional recrystallization from methanol and displayed: M. P., 231–233° C.; $[\alpha]_D$, —124.6° (chloroform). Calculated, $C_{29}H_{44}O_5$: C—73.69%, H—9.38%. Found: C—73.89%, H—9.50%.

The pure 5β,6β-oxido-22-isoallospirostan-3β-ol-acetate recovered from the chloroform had the following constants: M. P. 188–192° C.; $[\alpha]_D$ —73.6 (CHCl$_3$). Calculated, $C_{29}H_{44}O_5$: C—73.69%, H—9.38%. Found: C—73.64%, H—9.67%.

Grignard reaction 40 g. of 5α,6α-oxido 22-isoallospirostan-3β-ol acetate was dissolved in 600 ml. of benzene and brought to 0° C. at which time 400 ml. of a 3-molar solution of methyl magnesium bromide in ether was added slowly. The resulting solution was refluxed for 8 hours. Thereafter the excess reagent was eliminated by the slow addition of water with concomitant cooling and agitation. The precipitate which formed was dissolved by the addition of a 5% solution of sulfuric acid. The benzene layer was separated and washed with water to neutrality. The original aqueous phase as well as the aqueous washings were extracted separately with two batches of ether (100 ml. each). The benzene extract was combined with the ether extracts and evaporated to dryness on the steam bath. Crystallization from chloroform-methanol yielded 32.5 g. of crystalline material with M. P., 213–217° C.; $[\alpha]_D$, —80° (chloroform). A purified sample of 6β-methyl-22-isoallospirostane-3β,5α-diol prepared by recrystallization from chloroform-methanol showed M. P., 220–222° C.; $[\alpha]_D$, —82.5° (chloroform). Calculated, $C_{28}H_{46}O_4 \cdot \frac{1}{2}(CH_3OH)$: C—74.0%, H—10.4%. Found: C—74.2%, H—10.36%.

Isomerization and chromic acid degradation 43 g. of 6β-methyl-22 isoallospirostane-3β,5α-diol (5α-hydroxy-6β-methyl tigogenin) was treated with 200 ml. of acetic anhydride at 195° C. for 8 hours; the resulting solution containing 6 methyl furostane derivative was diluted with 500 ml. of a 90% aqueous solution of acetic acid, and oxidized at a temperature of 13°–15° C. with a solution of 17.5 g. of chromium trioxide dissolved in 40 ml. of water and 200 ml. of acetic acid. The mixture was allowed to stand at ambient temperature for 30 minutes, then the acetic acid was distilled off under vacuum until a viscous oil was obtained. 100 ml. of 80% acetic acid was added to the oil and the mixture refluxed for two hours. The resulting product was added to an excess of water and the oily precipitate which formed was extracted with ethyl acetate. The extract was distilled to dryness yielding a yellow-green oil which, after chromatography, gave 15 g. of 6-methyl-$\Delta^{5,16}$-pregnadien-3β-ol-20-one acetate. The pure sample was prepared by successive crystallizations from methanol and displayed M. P. 115°–117° C.; $[\alpha]_D$ —38.9° (CHCl$_3$); ln$\epsilon$ 4.00 at λ max. 240 mu. The specific optical rotation is in agreement with that calculated by the method of molecular rotation differences from existing data for the cholesterol series. Infra-red absorption bands were found as follows: 1656 cm.$^{-1}$ and 1582 cm.$^{-1}$ for the $\Delta^{16}$-20-one system, and 1722 cm.$^{-1}$ for the acetate. Calculation for $C_{24}H_{34}O_3$ gave C—77.79%, H—9.24%. Elemental analysis showed C—77.97%, H—9.22%.

EXAMPLE II

Epoxidation 100 g. of $\Delta^5$-22-isopirosten-3β-ol [diosgenin; M. P., 206.8–207.8; $[\alpha]_D$ —127° (chlf.)] was dissolved in one liter of methylene chloride and during ice cooling there was added a solution of: 200 ml. acetone, 200 ml. methylene chloride, 2 g. sodium acetate and 65 ml. of commercial peracetic acid. After completion of the addition the mixture was left at room temperature for 5 hours and then washed with one liter of a 5% ferrous sulfate solution which reduced the excess peracetic acid. The lower layer was separated sharply and washed twice with one liter of water each time. 100 ml. methylene chloride was used as a tailer to re-extract the aqueous phases. The methylene chloride extracts were combined and concentrated to dryness on the steambath. Heptane (one liter) was added and a small head fraction was distilled in order to remove residual methylene chloride. The mixture was cooled to 30° C. under agitation and the crystalline material filtered. This material was a mixture of α and β epoxides; it showed an optical rotation of $[\alpha]_D$, $-120°$ (in chloroform), indicating predominance of the α-epoxide. The mother liquor was evaporated to a small volume and a second crop harvested which has $[\alpha]_D$ $-107°$, being also a mixture of the two epimeric epoxides, however, containing mainly the β-epoxide. The first crop weighed 75 g. and was dissolved in methylene chloride. 1.5 liters of heptane was added and the mixture was distilled to remove the methylene chloride. Before all the methylene chloride had been removed the α-epoxide crystallized; however, the distillation was continued until the methylene chloride had been completely removed. Filtration in the hot (55–60°) provided 50 g. of close to stereo-chemically pure α-epoxide—M. P. 225–227°; $[\alpha]_D$ $-131°$ (chlf.). This material was found ideally suited for the subsequent Grignard reaction; however, additional crystallization from heptane raised the rotation to $-133°$ (chlf.). Chromatography failed to improve the constants further and it was therefore inferred that pure 5α,6α-oxido-22-isoallospirostan-3β-ol had the constants: M. P. 226–227° C., $[\alpha]_D$ $-133°$ (chloroform). Calculated: C—75.30%, H—9.83%. Found: C—75.03%, H—10.02%.

The mother liquors were taken down to a small volume and 24 g. of mixture of the α- and β-oxide obtained showing $[\alpha]_D$ $-120°$, which indicated the same composition as the original crude material for which reason it ideally can be admixed with the crude α,β-oxide in subsequent runs, or recrystallized separately from methylene chloride-heptane in accord with the technique described above to give additional 16–18 g. of the purified α-oxide with a specific rotation of 130° to 131°.

The second crop from the crude crystallization described above having a specific rotation of $-107°$, was dissolved in isopropanol and concentrated to half volume. Cooling to 25° C. provided 18 g. of substantially pure 5β,6β-oxido-22-isopirostan-3β-ol showing M. P., 2.01–204°; $[\alpha]_D$, $-81°$ (chlf.). Repeated crystallization from isopropanol gave the pure sample exhibiting: M. P., 206–210°; $[\alpha]_D$, $-67.9°$ (chlf.). Calculated, $C_{27}H_{42}O_4$: C—75.30%, H—9.83%. Found: C—75.40%, H—10.03%. The rotation of $-67.9°$ checks within one degree with the calculated value for 5β,6β oxido-22-isospirostan-3β-ol based on molecular rotation increments from the cholesterol series. This sample had identical constants with what was obtained chromatographically.

Concentration of the second crop provided a small amount (4–5 g.) of a mixture of the epimeric oxides having constants similar to the original crude ($[\alpha]_D$,~$-120°$). As the hydrolytic opening of an oxirane ring is always trans, hydrolysis of the epimeric epoxides in this case will always result into formation of the same triol (3β,5α, 6β). Closing the oxirane ring again via the 6-mesyl esters will give the α oxide.

Grignard methylation

In an absolute dry and clean 3 neck flask, two liters of a 3-molar commercial solution of methylmagnesium bromide is charged. From an addition funnel is slowly added a solution of 150 g. of 5α,6α-22-isoallospirostan-3β-ol in three liters of toluene, and the mixture refluxed during a period of 2½ hours. The flask is cooled in an ice water bath and water added until no more reaction can be observed. The toluene solvent is removed by direct steam injection, and the residual suspension cooled. Hydrochloric acid (400 ml. conc., 400 ml. water) is added in order to dissolve the inorganics, and the crude methylated steroid is collected by filtration, washed and dried. It weighed 165 g. This crude material is dissolved in methylene chloride, treated with carbon ("Nuchar" activated charcoal) and filtered in a bed of celite. The clear filtrate is concentrated to a small volume and methanol added. Further concentration until the methylene chloride is completely removed and up to the beginning of crystallization gives 105 g. of white crystalline 6β-methyl-22-isoallospirostane-3β,5α-diol with M. P. 224–230°; $[\alpha]_D$ $-83°$ (chloroform). One recrystallization from methanol gives the pure material exhibiting M. P. 226.5–230° C.; $[\alpha]_D$ $-85°$ (chloroform). Additional recrystallizations give material of identical constants.

Acetylation

6β-methyl-22-isoallospirostane-3β,5α-diol (100 g.; M. P. 224–230°; $[\alpha]_D$, $-83°$) was heated during reflux with 75 ml. acetic anhydride and 90 ml. of pyridine for a period of one hour. Addition of water under ice cooling provided a crystalline precipitate which was filtered and washed with water until complete disappearance of the pyridine odor. Recrystallization of this material (109 g.) from a methylene chloride-methanol mixture gave 90 g. of 6β - methyl - 22 - isoallospirostane - 3β,5α - diol - 3-monoacetate displaying M. P. 230–233°; $[\alpha]_D$ $-85$ (chloroform). Calculated, $C_{30}H_{48}O_5$: C—73.72%, H—9.90%. Found: C—73.97%, H—10.08%. One additional recrystallization provided the pure sample which had possibly ½ degree higher melt.

Isomerization and oxydative degradation 10 g. of 6β - methyl-22-isoallospirostane - 3β,5α-diol-3-acetate was reacted at 195° C. with 15 ml. of acetic anhydride in a sealed tube for six hours. After cooling, the mixture was diluted with 45 ml. of 95% of acetic acid and 45 ml. of methylene chloride and the solution cooled to +9° C. A solution of 4.1 g. chromium trioxide in 7.5 ml. of water and 10 ml. of acetic acid was added slowly over a period of ¾ of an hour in such a way that the temperature raised gradually to 15° C. After completion of the addition, the mixture was kept agitating for one hour with a gradual raise in the temperature to 26° C. 55 ml. of salt water was added and the methylene chloride layer separated. The remaining aqueous phase was reextracted twice with 15 ml. methylene chloride each time, and the combined methylene chloride layers concentrated to dryness on the steam bath. This treatment was found to be sufficient to dehydrate the "diosone" (e. g.— γ=methyl–δ-acetoxyvalerianic esters of 16β-hydroxylated steroids) to the Δ16-20-ketone provided that the residue still containing acetic acid and water was left on the steam bath for one hour. Chromatography of this residue from haptane (after appropriate neutralization of the residual acetic acid) and elation of the column with heptane-benzene gave a crystalline fraction of 6β-methyl-Δ5,16-pregnadien-3β-ol-20-one acetate which after recrystallization from methylene chloride methanol showed M. P. 114.5–117°; $[\alpha]_D$ $-38°$ (chlf.).

What is claimed is:

1. A procedure for converting a compound selected from the group consisting of diosgenin and its acetate into 6-methyl steroids, which comprises contacting the compound with an epoxidizing reagent selected from the group consisting of peracetic acid, perphthalic acid and perbenzoic acid to form the corresponding 5,6 oxide, treating the oxide with methyl magnesium bromide to obtain the corresponding 6-methyl-22-isoallospirostane-3β,5α-diol compound, and thereafter degrading the compound by contact with acetic anhydride at elevated temperatures, followed by contact with an acetic acid solution of chromium trioxide to form 6-methyl-5,16-pregnadiene-3β-ol-20-one acetate.

2. The process of claim 1 wherein the 5,6 oxide is separated into its α and β constituents by diluting a methylene chloride solution of the 5,6 oxide with normal heptane then distilling away the methylene chloride whereby the α oxide precipitates while the β oxide remains in heptane solution, and the α oxide precipitate is recovered and employed in the subsequent conversion.

3. The process of claim 1 wherein the 5,6 oxide is treated with methyl magnesium bromide in a solvent selected from the group consisting of benzene, toluene, xylene and mixtures thereof.

4. A procedure for converting diosgenin acetate into 6-methyl steroids which comprises contacting the compound with an epoxidizing reagent selected from the group consisting of peracetic acid, perphthalic acid and perbenzoic acid diosgenin acetate to form the α and β-5,6-oxido-22-isoallospirostan-3β-ol acetate, isolating the α oxide by concentrating a dispersion of the mixed 5,6 epoxides in chloroform, then diluting with methanol, followed by partial concentration of the resulting methanol-steroid mixture, whereby the α epoxide is present as finely divided solids while the β epoxide is dissolved in the methanol, treating the α oxide with methyl magnesium bromide to form the 6α-methyl-isospirostan-3,5-diol-3 acetate, and thereafter degrading the 5-hydroxy-6-methyl compound by contact with acetic anhydride at elevated temperatures, followed by contact with an acetic acid solution of chromium trioxide to form 6-methyl-$\Delta^{5,16}$-pregnadien-3β-ol-20-one acetate.

5. The process of claim 4 wherein the β-5,6-oxido-22-isoallospirostan is recovered from the methanol solution.

6. A material selected from the group consisting of 5α,6α-oxido-22-isoallospirostan-3β-ol - 5β,6β - oxido - 22-isoallospirostan-3-β-ol, mixtures thereof, 5α,6α-oxido-22-isoallospirostan-3-β-ol acetate, 5β,6β-oxido-22-isoallospirostan-3-β-ol acetate and mixtures of said acetates.

7. 6β-methyl-22-isoallospirostan-3β,5α-diol-3 monoacetate.

8. 6β-methyl-22-isoallospirostan-3β,5α-diol.

9. 5α,6α-oxido-22-isoallospirostan-3β-ol acetate.

10. 5α,6α-oxido-22-isoallospirostan-3β-ol.

11. 5β,6β-oxido-22-isoallospirostan-3β-ol.

12. 5β,6β-oxido-22-isoallospirostan-3-β-ol acetate.

No references cited.